(12) United States Patent
Terry et al.

(10) Patent No.: US 6,975,650 B2
(45) Date of Patent: Dec. 13, 2005

(54) TRANSPORT BLOCK SET SEGMENTATION

(75) Inventors: Stephen Terry, Northport, NY (US); Ariela Zeira, Huntington, NY (US); Nader Bolourchi, Larchmont, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 104 days.

(21) Appl. No.: 10/279,365

(22) Filed: Oct. 24, 2002

(65) Prior Publication Data

US 2003/0152062 A1 Aug. 14, 2003

Related U.S. Application Data

(60) Provisional application No. 60/357,198, filed on Feb. 13, 2002.

(51) Int. Cl.[7] .................................................. H04J 3/24
(52) U.S. Cl. ........................ 370/473; 370/470; 370/474
(58) Field of Search ................................ 370/470–474, 370/468, 320, 332–333, 335, 349, 342; 450/450–451, 501, 504, 517, 63, 67.1, 67.3

(56) References Cited

U.S. PATENT DOCUMENTS

| | | | |
|---|---|---|---|
| 5,224,098 A | | 6/1993 | Bird et al. |
| 6,308,294 B1 | * | 10/2001 | Ghosh et al. ................ 714/751 |
| 6,359,877 B1 | * | 3/2002 | Rathonyi et al. ............ 370/349 |
| 6,647,477 B2 | | 11/2003 | Janoska et al. |
| 2001/0055290 A1 | | 12/2001 | Seidel et al. |
| 2002/0055290 A1 | * | 5/2002 | Jazowski et al. ............ 439/187 |
| 2002/0071407 A1 | * | 6/2002 | Koo et al. .................... 370/335 |
| 2002/0080902 A1 | * | 6/2002 | Kim et al. .................... 375/377 |
| 2002/0168945 A1 | * | 11/2002 | Hwang et al. ................. 455/69 |

FOREIGN PATENT DOCUMENTS

| | | |
|---|---|---|
| WO | 99/12303 | 3/1999 |
| WO | 00/05911 | 2/2000 |
| WO | 00/49760 | 8/2000 |

OTHER PUBLICATIONS

J. Yang, A. K. Khandani and N. Tin, "Adaptive Modulation and Coding in 3G Wireless Systems"; Aug. 6, 2002; http://www.cst.uwaterloo.ca/r/yang–khandani–2002.pdf.*
"Adaptive Modulation and Coding (AMC)"; Motorola Stockholm, Sweden, Oct. 20–24, 2000; Agenda Item: Adhoc#24; http://www.3gpp.org/ftp/tsg_ran/WG1_RL1/TSGR1_17/ Docs/PDFs/R1–00–1395.pdf.*
M. Dottling, A. Michel, and B. Raaf, "Hybrid ARQ and Adaptive Modulation and Coding Schemes for High Speed Downlink Packet Access"; The 13th IEEE International Symposium on Personal, Indoor and Mobile Radio Communications, vol. 3, 2002 pp. 1073–1077.*
S. Choi; K. G. Shin, "A Class of Adaptive Hybrid ARQ Schemes for Wireless Links"; IEEE Transactions on Vehicular Technology; vol. 50, No. 3, May 2001; pp. 777–790.*

* cited by examiner

*Primary Examiner*—Chi Pham
*Assistant Examiner*—Thai Hoang
(74) *Attorney, Agent, or Firm*—Volpe and Koenig, P.C.

(57) ABSTRACT

Data of a transport block set is to be transmitted in a wireless communication system. The wireless communication system uses adaptive modulation and coding and has a physical layer hybrid automatic repeat request mechanism. Segmentation information for potential segmentation of the transport block set is provided. The transport block set is transmitted with a first specified modulation and coding scheme. The transport bock set is received and whether the received transport block set is determined to meet a specified quality. When the specified quality is not met, a repeat request is transmitted. The first specified modulation and coding set is changed to a second specified modulation and coding set. In response to the repeat request, the transmit block set is segmented into a plurality of segments supported by the second specified modulation and coding set in accordance with the provided segmentation information. The segments are transmitted and at least two of the segments are transmitted separately. The transmitted segments are received. The segmentation process may be applied more than once for a particular TBS transmission.

7 Claims, 5 Drawing Sheets

TRANSPORT BLOCK SET SEGMENTATION

This application claims priority to U.S. Provisional Application No. 60/357,198, filed Feb. 13, 2002.

BACKGROUND

This invention generally relates to wireless communication systems. In particular, the invention relates to transmission of data in such systems where adaptive modulation and coding (AMC) and hybrid automatic repeat request (H-ARQ) techniques are applied.

In wireless communication systems, such as the third generation partnership project (3GPP) time division duplex (TDD) or frequency division duplex (FDD) communication systems using code division multiple access (CDMA) or orthogonal frequency division multiplex (OFDM) systems, AMC is used to optimize the use of air resources.

The modulation and coding schemes (sets) used to transmit data are varied based on wireless channel conditions. To illustrate, a type of data encoding (such as turbo versus convolutional coding), coding rate, spreading factor for CDMA system, modulation type (such as quadrature phase shift keying, M-ary phase shift keying versus M-ary quadrature amplitude modulation), and/or a number of sub-carriers for an OFDM system may change. If channel characteristics improve, a lower data redundancy and/or "less robust" modulation and coding set is used to transfer data. As a result, for a given allocation of radio resources, more user data is transferred resulting in a higher effective data rate. Conversely, if channel characteristics degrade, a higher data redundancy and/or "more robust" modulation and coding set is used, transferring less user data. Using AMC, an optimization between air resource utilization and quality of service (QOS) can be better maintained.

Data in such systems is received for transfer over the air interface in transmission time intervals (TTIs). Data within a TTI transferred to a particular user equipment is referred to as a transport block set (TBS). For a particular allocation of air resources, a less robust modulation and coding set allows for larger TBS sizes and a more robust modulation and coding set only allows for smaller TBS sizes. As a result, the modulation and coding set for a given radio resource allocation dictates the maximum size of the TBS that can be supported in a given TTI.

In such systems, a hybrid automatic repeat (H-ARQ) request mechanism may be used to maintain QOS and improve radio resource efficiency. A system using H-ARQ is shown in FIG. 1. A transmitter 20 transmits a TBS over the air interface using a particular modulation and coding set. The TBS is received by a receiver 26. A H-ARQ decoder 30 decodes the received TBS. If the quality of the received data is unacceptable, an ARQ transmitter 28 requests a retransmission of the TBS. One approach to check the quality of the received TBS is a cyclic redundancy check (CRC). An ARQ receiver 22 receives the request and a retransmission of the TBS is made by the transmitter 20. To increase the probability of successful delivery, retransmissions may apply a more robust modulation and coding set. The H-ARQ decoder 30 combines, the received TBS versions. A requirement for combining is that combined TBS sizes are identical. If the resulting quality is still insufficient, another retransmission is requested. If the resulting quality is sufficient, such that the combined TBS passes the CRC check, the received TBS is released for further processing. The H-ARQ mechanism allows for data received with unacceptable quality to be retransmitted possibly at a more robust MCS to ensure successful delivery and maintain the desired QOS.

Another approach is to retransmit the TBS using the old modulation and coding set. However, if the channel conditions dictate that a more robust modulation and coding set be used or the initial transmission was severally corrupted, the combining of the retransmitted TBSs may never pass, resulting in a transmission failure.

In a system using both H-ARQ and AMC, a change in modulation and coding set may be determined necessary to achieve successful delivery of a requested TBS retransmission. In this situation, the maximum amount of physical data bits allowed within the TTI varies with the modulation and coding set.

Since only one TBS exists per TTI, the effective user data rate corresponds to the TBS size applied to each TTI. To achieve maximum data rates the largest TBS size is applied to the least robust modulation and coding set within the TTI. When wireless channel conditions require more a robust modulation and coding set for successful transmission, such a TBS size can not be supported within the TTI. Therefore, each time a more robust modulation and coding requirement is realized, all outstanding transmissions in H-ARQ processes with TBS sizes not supported by this MCS and have not been successfully acknowledged are discarded.

In current implementations, when a TBS can not be successfully transmitted utilizing AMC and H-ARQ mechanisms, recovery is handled by the radio link control (RLC) protocol (at layer two). Unlike a H-ARQ recovery of failed transmissions, the RLC en-or detection, data recovery and buffering of a TBS queued in the node-B results in increased transport channel block error rates and transmission latency, potentially resulting in a failure to meet QOS requirements.

Accordingly, it is desirable to have alternate approaches to recover unsuccessful transmissions in such systems to allow for support of high data rates when AMC and H-ARQ techniques are applied.

SUMMARY

Data of a transport block set is to be transmitted in a wireless communication system. The wireless communication system uses adaptive modulation and coding and has a hybrid automatic repeat request mechanism. Segmentation information for potential segmentation of the transport block set is provided. The transport block set is transmitted with a first specified modulation and coding scheme. The transport bock set is received and the received transport block set is determined to meet a specified quality. When the specified quality is not met, a repeat request is transmitted. The first specified modulation and coding set is changed to a second specified modulation and coding set. In response to the repeat request, the transmit block set is segmented into a plurality of segments supported by the second specific modulation and coding set in accordance with the provided segmentation information. The segments are transmitted and at least two of the segments are transmitted separately. The transmitted segments are received. The segmentation process may be applied more than one for a particular TBS transmission.

BRIEF DESCRIPTION OF THE DRAWING(S)

DETAILED DESCRIPTION OF THE PREFERRED EMBODIMENT(S)

Transport block set segmentation can be used in a variety of wireless communication systems, such as FDD/CDMA, TDD/CDMA and OFDM communication systems.

Figure 1:
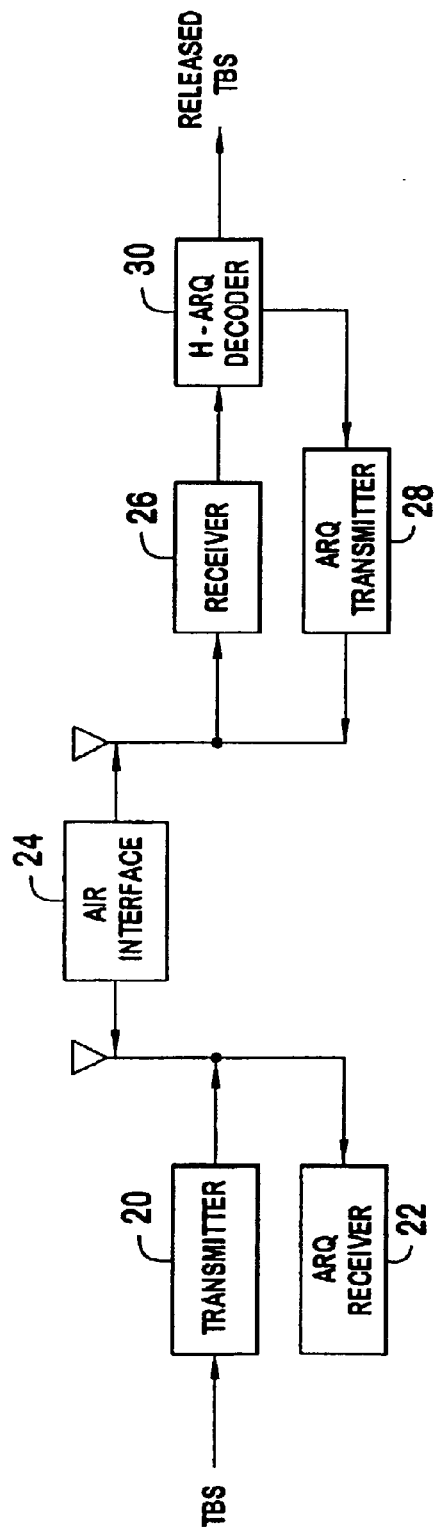
FIG. 1 is an embodiment of a wireless H-ARQ communication system.
Figure 2:
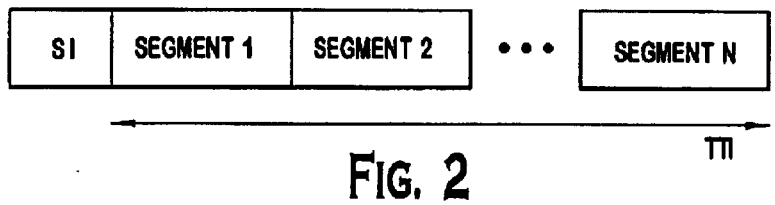
FIG. 2 is an illustration of a segmented TBS.

To support high data rates, large TBS sizes are applied to each TTI. To allow for retransmission of large TBS sizes, at more robust modulation and coding sets to ensure successful delivery, segmentation information is provided with the TBS transmission. FIG. 2 illustrates a TBS with segmentation information (SI) in a TTI. The data within the illustrated TBS is segmented into multiple segments, segment 1 to segment N. Each segment is sized to have a data size that can be supported by a more robust modulation and coding set. Segmentation information (SI) is multiplexed with the TBS data. Although the segmentation information is shown as a header in FIG. 2, the segmentation information may be located anywhere within the structure of the TBS transmission (in-band). The segmentation information can be used for segmentation of the TBS.

Figure 3A:
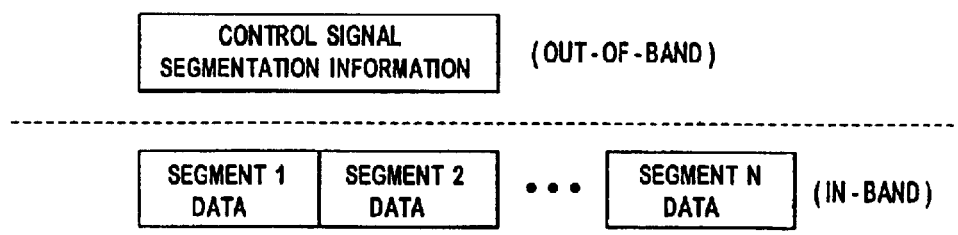
FIG. 3A is an illustration of a segmented TBS with a control message sent out-of band.

Alternatively, FIG. 3A illustrates using control signaling to send segmentation information. The control signal is sent on a separate channel (out-of-band) from the segment data, segment 1 to segment N, (in-band). The segmentation information indicates the manner that the TBS was segmented for use in reconstructing the original TBS in the receiver.

Figure 3B:
FIG. 3B is an illustration of a segmented TBS having segment identifiers.
Figure 3C:
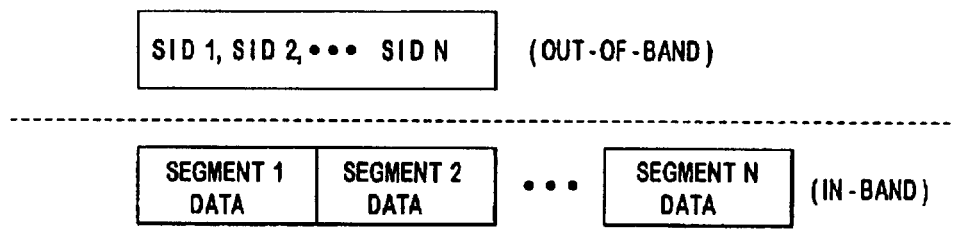
FIG. 3C is an illustration of a segmented TBS with segment identifiers sent out of band.

FIG. 3B illustrates using a segmentation identifier (SID) as in-band segmentation information. Each segment, segment 1 to segment N, has a corresponding segment identifier, SID 1 to SID 2, multiplexed with that segment's data (in-band). FIG. 3C illustrates using a SID as out-of-band segmentation information.

Figure 4:
FIG. 4 is an illustration of a segmented TBS having transport sequence numbers.

FIG. 4 illustrates a preferred segmentation identifier for a segmented TBS. The medium access controller (MAC) assigns a transmission sequence number (TSN) to each potential segment. If the TBS is segmented, each segment's data is associated with that segment's TSN. As shown in FIG. 4, each segment has its own TSN, TSN 1 to TSN N. In a wireless communication system employing H-ARQ, TSNs are assigned to each TBS to allow for sequential processing. Using the TSN as a segment identifier, reduces modifications required and minimizes additional complexity of the system to accommodate segmentation.

Figure 5:
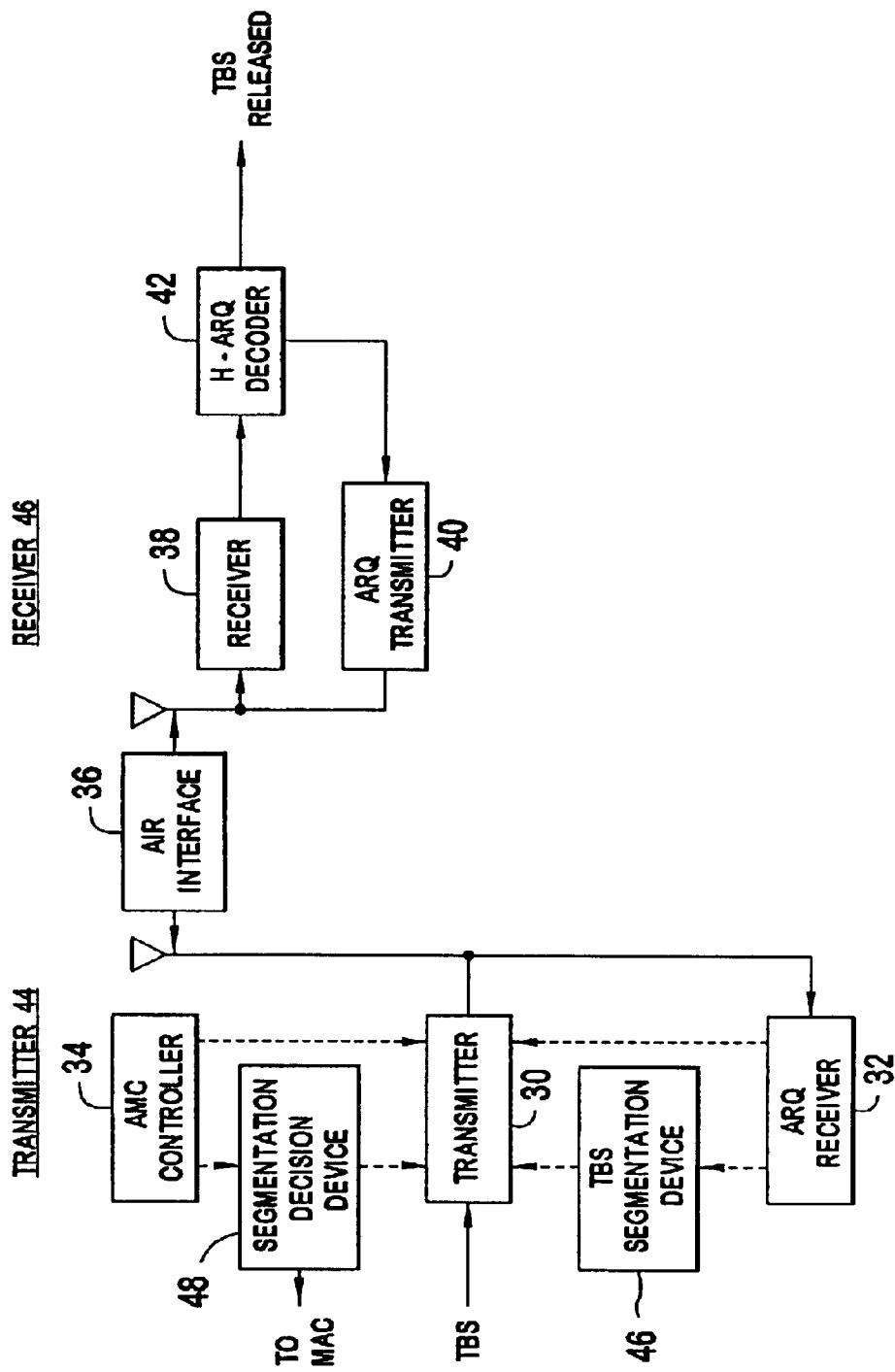
FIG. 5 is an embodiment of a segmented TBS wireless communication system.

FIG. 5 is a simplified diagram of a transmitter 44 and a receiver 46 for retransmitting a TBS in segments. The transmitter 44 may be located at either a user equipment or a base station/node-B. The receiver 46 may be located at either a base station/node-B or a user equipment. In current system implementations, AMC is typically only used in the downlink. Accordingly, the preferred implementation of transport block segmentation is for use in the supporting AMC for the downlink. For other systems using AMC in the uplink, transport block segmentation can be applied to the uplink.

A transmitter 30 transmits a TBS over the air interface 36. A receiver 38 receives the transmitted TBS. A H-ARQ decoder 42 decodes each received TBS. If the TBS fails the quality test, a request for retransmission is made by the ARQ transmitter 40. An ARQ receiver 32 receives the request and directs the TBS to be retransmitted. The retransmitted TBS is combined by the H-ARQ decoder 42 and another quality test is performed. Once the TBS passes the quality test, it is released for further processing.

Figure 6:
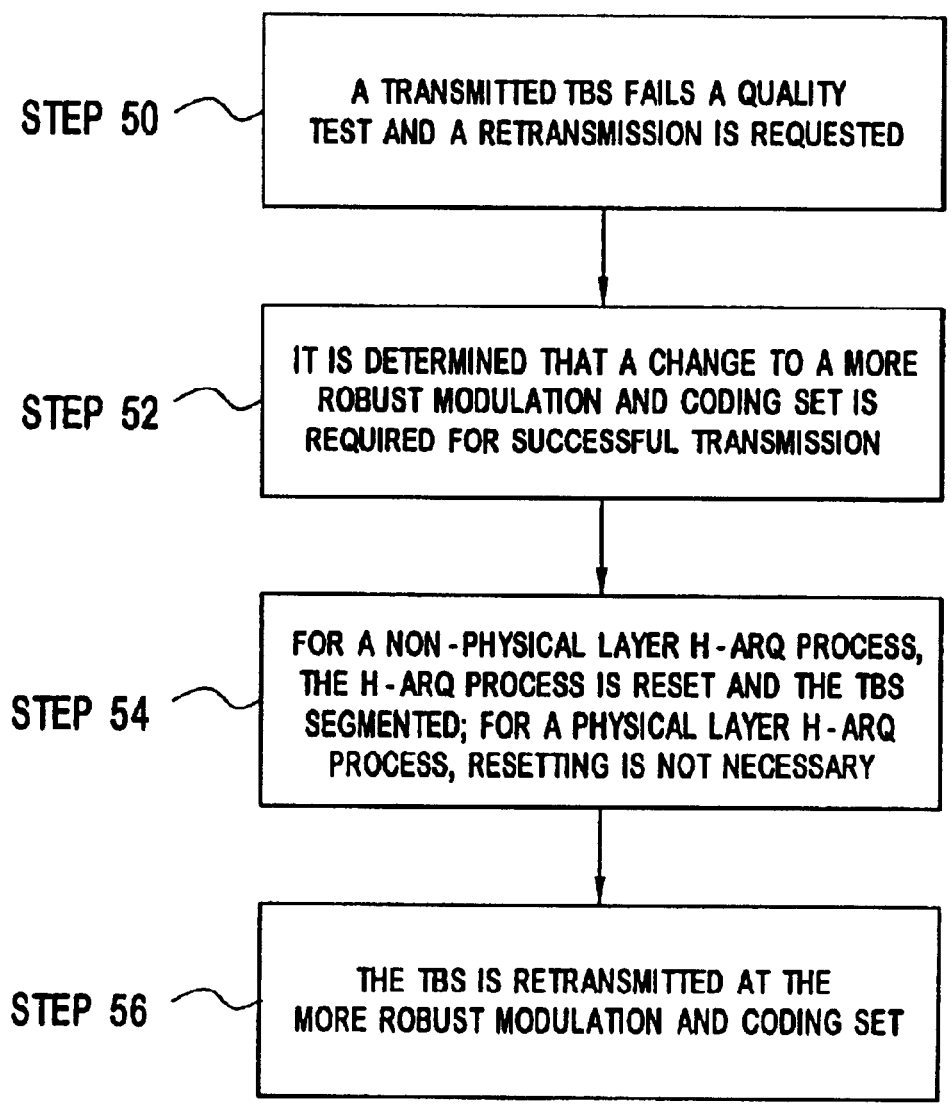
FIG. 6 is a flow chart of segmenting a TBS.

An AMC controller 34 is also shown in FIG. 5. If the channel conditions change, the AMC controller may initiate a change in the modulation and code set used to transfer data. FIG. 6 is a flow diagram illustrating such a change occurring in AMC between H-ARQ retransmissions. A transmitted TBS fails the quality test and a retransmission is requested, (step 50). To illustrate using FIG. 7, a TBS is transmitted and the received transmission fails the quality test, as indicated by a "X". It is determined that a change to a more robust modulation and coding set is required for successful transmission, (step 52). Since a more robust modulation and coding set is needed, retransmission of the same size TBS may not be possible. The H-ARQ process is reset and the TBS is segmented using the TBS segmentation device 46, (step 54). Typically, with physical layer segmentation, resetting the H-ARQ process is not necessary for proper operation. Each segment or subset of segments of the original TBS is at a size compatible with the new modulation and coding set. To illustrate using FIG. 7, the original TBS is segmented into three segments, SEG1, SEG2 and SEG3. The segments are retransmitted at the more robust modulation and coding set, (step 56).

Figure 7:
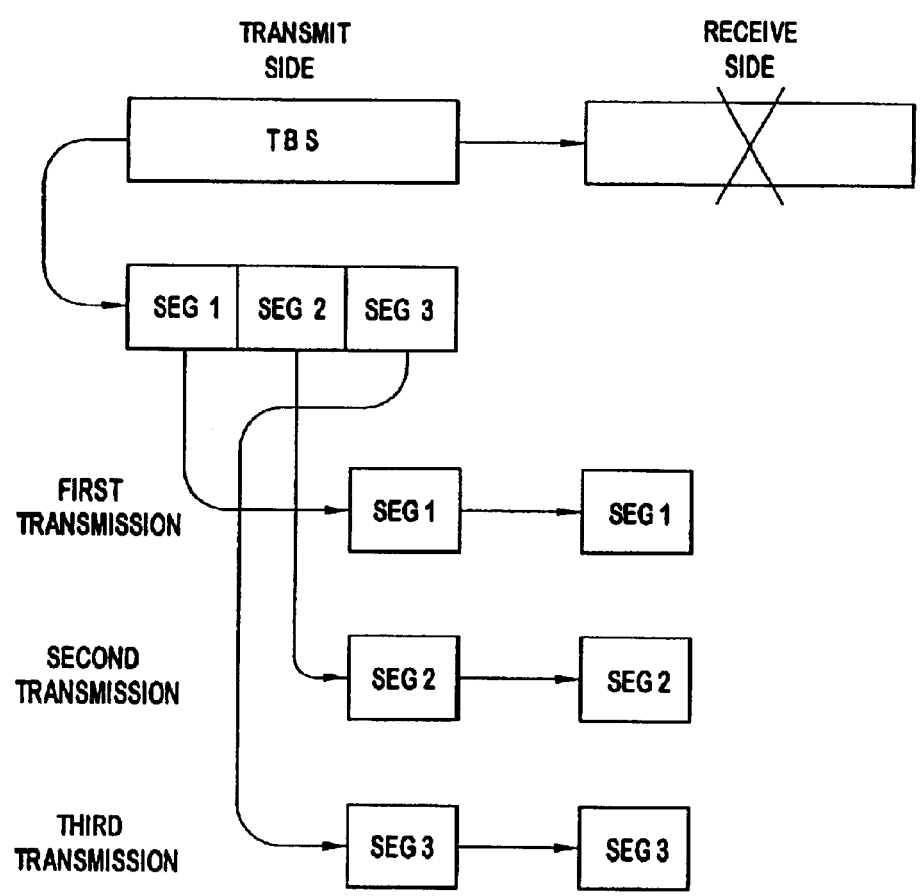
FIG. 7 is an illustration of segmenting a TBS into three segments.

Each segment or subset of segments is individually transmitted using the new modulation and coding set. As illustrated in FIG. 7, SEG1, SEG2 and SEG3 are separately transmitted and received. It is also possible depending on the choice of modulation and coding that any subset may be separately transmitted and received (SEG1 & SEG3, or SEG2 &SEG3, etc.). If a transmission of a segment or subset of segments fails, the ARQ transmitter 40 requests a retransmission of that segment or subset of segments. The transmission of the segment or subset of segments and the retransmission(s) are combined until the segment or subset of segments passes the quality test.

To reduce the added overhead required by the segmentation information, preferably, the node-B selectively dictates when the segmentation option is to be utilized. To illustrate, if channel conditions are degrading or are predicted to degrade, the segmentation option may be utilized. This determination may be based on channel quality measurements, previous transmission success/failure rates for particular modulation and coding sets, or other criteria. A segmentation controller 48, preferably in the node-B, as shown in FIG. 5, decides whether segmentation is to be supported. The segmentation controller coordinates operation with the MAC to add the segmentation information to the TBS. The segmentation decision may be based on various factors, such as cell loading, added users, number of prior retransmissions and measured channel quality.

What is claimed is:

1. A user equipment for receiving data of a transport block set in a wireless communication system using adaptive modulation and coding and having a physical layer hybrid automatic repeat request mechanism, the user equipment comprising:

a receiver for receiving a transport block set and determining whether the received transport block set meets a specified quality and for receiving retransmitted segments of the transport block set in subsequent transmissions, the retransmitted segments transmitted using a different modulation and coding set than the transport block set and at least two of the retransmitted segments transmitted separately, the receiver receiving segmentation information for using in combining the retransmitted segments;

a hybrid automatic repeat request decoder for determining whether each received transport block set and retransmitted segments meets a specified quality; and an automatic repeat request transmitter for transmitting a repeat request when the transport block set or retransmitted segments do not meet the specified quality; and wherein the receiver receiving the segmentation information is prior to the hybrid automatic repeat request decoder requesting a retransmission of each received transport block set.

2. A user equipment for receiving data of a transport block set in a wireless communication system using adaptive modulation and coding and having a physical layer hybrid automatic repeat request mechanism, the user equipment comprising:

means for receiving a transport block set and determining whether the received transport block set meets a specified quality and receiving segmentation information for use in combining retransmitted segments;

means for receiving the retransmitted segments of the transport block set in subsequent transmissions, the retransmitted segments transmitted using a different modulation and coding set than the transport block set and at least two of the retransmitted segments transmitted separately;

means for determining whether each received transport block set and the retransmitted segments meets a specified quality; and means for transmitting a repeat request when the transport block set or retransmitted segments do not meet the specified quality; and wherein the receiving the segmentation information is prior to the transmitting the repeat request.

3. A method for transmitting data of a transport block set in a wireless communication system using adaptive modulation and coding and having physical layer hybrid automatic repeat request mechanism, the method comprising:

selectively supporting segmentation of a transport block set;

if supporting segmentation is not selected, transmitting the transport block set using the physical layer hybrid automatic repeat request mechanism;

if supporting segmentation is selected:
appending segmentation information to the transport block set and transmitting the transport block set with the appended segmentation information; and
selectively segmenting the transport block set prior to a retransmission of the transport block set using the physical layer hybrid automatic repeat request mechanism using the appended segmentation information.

4. The method of claim 3 wherein the selectively supporting is decided based on a cell loading.

5. The method of claim 3 wherein the selectively supporting is decided based on added users.

6. The method of claim 3 wherein the selectively supporting is decided based on a number of hybrid automatic repeat request retransmissions.

7. The method of claim 3 wherein the selectively supporting is decided based on a measured channel quality.

* * * * *

UNITED STATES PATENT AND TRADEMARK OFFICE
CERTIFICATE OF CORRECTION

PATENT NO. : 6,975,650 B2
APPLICATION NO. : 10/279365
DATED : December 13, 2005
INVENTOR(S) : Terry et al.

It is certified that error appears in the above-identified patent and that said Letters Patent is hereby corrected as shown below:

ON THE TITLE PAGE

At item (56), U.S. PATENT DOCUMENTS, page 1, left column, line 6, delete "2002/0055290 A1 5/2002 Jazowski et al. ... 439/187".

IN THE ABSTRACT

At item (57), ABSTRACT, right column, line 8, after the words "received and" insert --tested as to--.

At column 2, line 28, after the word "Unlike", delete "a" and insert therefor --an--.

At column 2, line 29, after "RLC", delete "en-or" and insert therefor --error--.

At column 2, line 48, delete "determined" and insert therefor --tested--.

At column 2, line 58, after the word "than", delete "one" and insert therefor --once--.

At claim 1, column 5, line 15, after "tion", delete "is" and insert therefor --receives same--.

UNITED STATES PATENT AND TRADEMARK OFFICE
CERTIFICATE OF CORRECTION

| | | |
|---|---|---|
| PATENT NO. | : 6,975,650 B2 | Page 2 of 2 |
| APPLICATION NO. | : 10/279365 | |
| DATED | : December 13, 2005 | |
| INVENTOR(S) | : Terry et al. | |

It is certified that error appears in the above-identified patent and that said Letters Patent is hereby corrected as shown below:

At claim 2, column 6, delete lines 4 & 5, and replace with --wherein the receiver receiving the segmentation information receives same prior to transmitting the repeat request.--.

Signed and Sealed this

Nineteenth Day of May, 2009

JOHN DOLL
*Acting Director of the United States Patent and Trademark Office*